Figure 1:
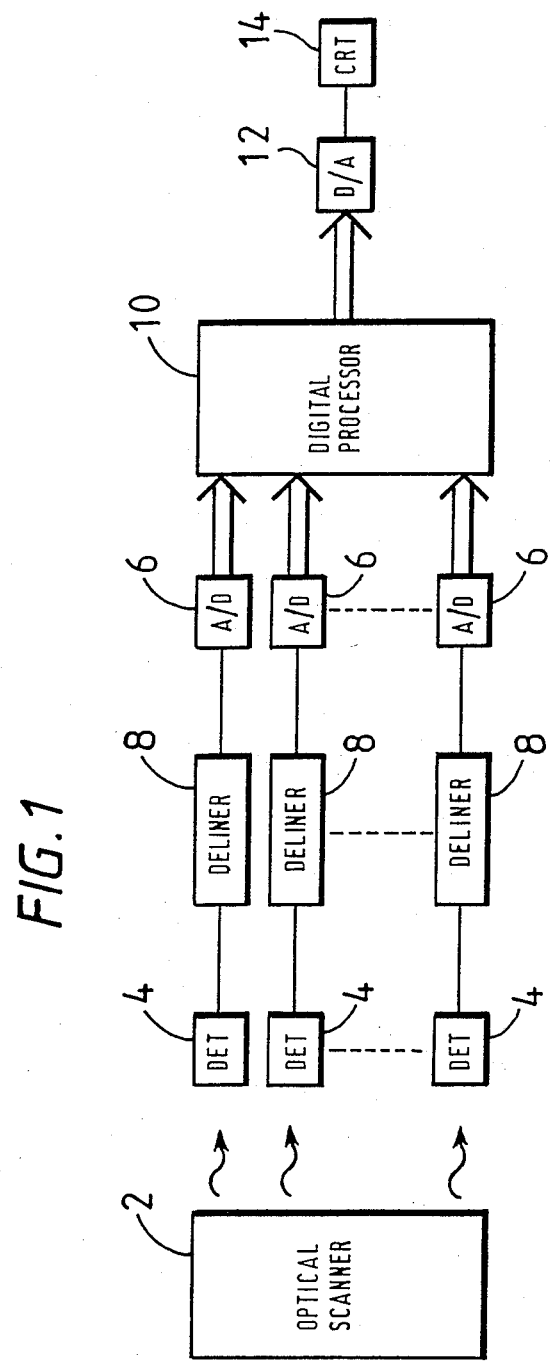

United States Patent [19]

Moore

[11] Patent Number: 4,868,389
[45] Date of Patent: Sep. 19, 1989

[54] THERMAL IMAGER

[75] Inventor: William T. Moore, Buckhurst Hill, United Kingdom

[73] Assignee: Rank Pullin Controls Limited, United Kingdom

[21] Appl. No.: 186,401

[22] Filed: Apr. 26, 1988

[30] Foreign Application Priority Data

Apr. 28, 1987 [GB] United Kingdom ............... 8710020

[51] Int. Cl.$^4$ .......................................... H01L 27/14
[52] U.S. Cl. .................... 250/332; 250/334; 358/113
[58] Field of Search ............. 250/332, 334, 330, 349; 358/113

[56] References Cited

U.S. PATENT DOCUMENTS

| | | | |
|---|---|---|---|
| 4,217,608 | 8/1980 | MacGregor et al. ............... | 358/113 |
| 4,298,887 | 11/1981 | Rode .................................... | 358/113 |
| 4,771,175 | 9/1988 | Sirieix et al. ........................ | 250/332 |

FOREIGN PATENT DOCUMENTS

| | | |
|---|---|---|
| 1549168 | 8/1975 | United Kingdom . |
| 1588018 | 6/1977 | United Kingdom . |
| 2022353A | 4/1979 | United Kingdom . |

*Primary Examiner*—Constantine Hannaher
*Attorney, Agent, or Firm*—Saidman, Sterne, Kessler & Goldstein

[57] ABSTRACT

A thermal imager is provided with a signal processing circuit which compensates for differences in the sensitivities of the thermal detectors. The compensating circuit produces a signal dependent on the mean output of each detector over a predetermined period, stores the signal in a storage device at a frequency of not more than once each field and applies a correction signal derived from the storage device to the detector.

15 Claims, 2 Drawing Sheets

THERMAL IMAGER

This invention relates to thermal imagers.

As is well known, thermal imagers may comprise an array of thermal detectors across which a thermal image is scanned. Typically, the array may comprise a small number of detectors compared with the number of lines in the displayed image, for example there may be eight detectors in which case the lines in the displayed image are produced in swathes of eight at a time. The sensitivity of thermal detectors generally differs from one to another and, as a consequence, it is necessary to compensate for these differences in order to avoid lininess in the image produced.

UK Patent Specification No. 1,549,168 (British Aircraft Corporation Limited) describes a circuit for reducing lininess in which, following production of each swathe, the thermal detectors are subjected to radiation from reference sources provided in the equipment and level (offset) and gain control circuits to which the outputs of the detectors are respectively applied are adjusted as necessary to correct for any variations in the outputs of the detectors. The problems with this arrangement are that the uniformity of the displayed scene is dependent upon the accuracy with which the equality of the radiations from the thermal references to the detectors can be guaranteed; that such reference surfaces must always be provided, which is not always convenient; and that any residual gain setting errors of the channels will reduce the uniformity of channel behavior when imaging scenes at an extreme temperature, e.g. a cold sky.

A further proposal for avoiding lininess is described in British Patent Specification No. 1,588,018 (Barr & Stroud Limited), in which there is provided, in an RC network whose time constant extends over a number of frames, a bank of capacitors which are fed respectively with the video signals arising from the respective detectors so that each capacitor builds up over a number of frames a voltage dependent upon the mean output of its respective detector. The capacitors are arranged in a feedback loop which is so arranged that the output of each detector is combined with an error signal derived from the voltage in the respective capacitor in such a way as to compensate for variations in sensitivity. In one of the circuits described in this prior art, the signals from the bank of capacitors are added to the signals from the detectors in an adding circuit and a further bank of capacitors is provided in which respective capacitors build up voltages dependent upon the square of the video signal derived from respective ones of the detectors and these voltages are combined with the outputs of the detectors in a multiplication circuit. In this prior art, the signals supplied to the capacitors are obtained from the video signal which is applied to the display, such as a CRT, and consequently switches, operative at line frequency, are required for switching the video signal to the respective capacitors in turn. The problem with this arrangement is that if the capacitor time constants are sufficiently long that AC droop is not manifest in the displayed picture, the level of display flicker is likely to be increased due to flicker noise from the detectors and amplifier.

The object of the invention is to solve the above described problems.

In one aspect, the invention provides a compensating means which includes a first storage means for storing signals dependent upon the outputs of the detectors over a period of time and a second storage means to which said signals are periodically transferred. The signals in the second storage means are used for compensation.

In an alternative aspect, the invention provides compensating means in which signals dependent upon the outputs of the detectors are derived during first periods and utilized for effecting compensation during second periods.

Figure 2:
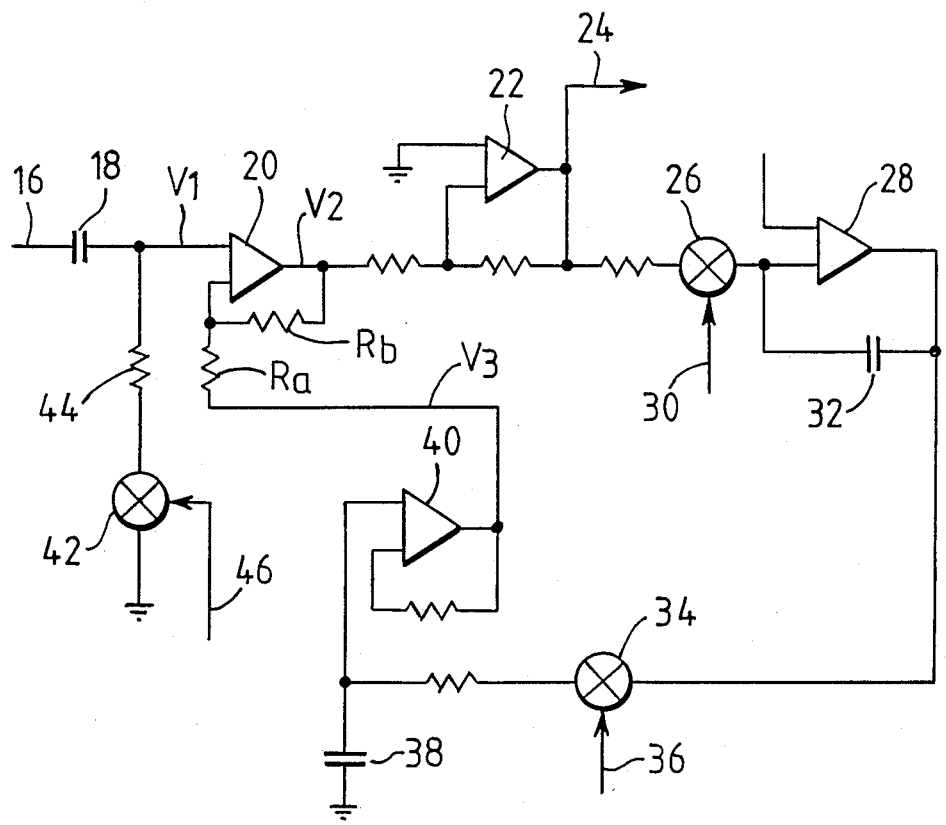

The invention is described by way of example with reference to the accompanying drawings, in which:

FIG. 1 is a block diagram of a thermal imager in accordance with an embodiment of the invention; and FIG. 2 is a diagram of a deliner circuit included in the thermal imager of FIG. 1.

With reference to FIG. 1, an optical scanner 2 scans a thermal image across an array of detectors 4 which may, for example, be an array of eight sprite detectors. The outputs of the detectors are supplied to analogue-to-digital converters 6 through respective deliner circuits 8 whose function is to compensate for differences in the response characteristics of different ones of the detectors 4. The outputs of the analogue-to-digital converter 6 are applied to digital processing circuitry 10 which may include swathe and/or frame stores and may perform various processes, preferably under microprocessor control, for improving the image. The processed digital signals from circuit 10 are applied line-by-line to a digital-to-analogue converter 12 whose output is an analogue video signal which is applied to a CRT 14 for display of a visible image.

With reference to FIG. 2, each deliner circuit 8 includes an input terminal 16 receiving the output from its respective detector 4, which output is supplied through a capacitor 18, a non-inverting differencing amplifier 20 and an inverting amplifier 22 to an output terminal 24 connected to the respective A to D converter 6. The output of the amplifier 22 is also supplied through a switch 26 to a Miller integrator 28. A control pulse on line 30 closes switch 26 during picture active periods i.e. those periods during which energy from the thermal image is incident upon the detectors 4. At other times, the switch 26 is open. A capacitor 32 of the integrator 28 accordingly builds a voltage which is the negative integral of the signal output by the amplifier 22 during picture active periods. A further switch 34 is controlled by field pulses derived from the CRT display 14, which pulses are applied to control line 36 of switch 34. These field pulses open switch 34 once every field or once every frame, either being possible, so that when the switch 34 is opened the voltage in capacitor S2 is transferred to a further capacitor 38. The voltage in capacitor 38 is amplified an inverting amplifier 40 whose output is connected to the amplifier 20 Which accordingly subtracts the output of amplifier 40 from the input signal on terminal 16. Thus, if one of the detectors 4 has a high sensitivity, the value of the voltage which is output by amplifier 40 is high and the signal output by amplifier 20 is reduced. If a particular one of the detectors 4 has a low sensitivity, the voltage subtracted from its output by amplifier 20 is decreased. In this way, variations in the sensitivities of the detectors 4 may be compensated.

The operation of the circuit can be further understood from the following equations:

$$V_1 = \frac{V_2 R_b + V_3 R_a}{R_b + R_a} \qquad (1)$$

$$V_2 = 1 + \frac{R_a}{R_b} V_1 - \frac{R_a}{R_b} \cdot V_3 \qquad (2)$$

where
- V1 is the input voltage from the detector;
- V2 is the voltage output by amplifier 20;
- V3 is the voltage output by amplifier 40; and
- Ra and Rb are the values of the resistors shown connected to amplifier 20.

Optionally, a switch 42 in series with a resistor 44 is connected between ground and the junction between capacitor 18 and amplifier 20. The switch 42 is controlled by signals on line 46 to ground the capacitor 18 through resistor 44, these components having the product of their values high compared with the duration of a frame. This grounding is through the picture active period, and its purpose is to reduce the need for capacitor 38 to follow large excursions with consequent risk of non-uniformity, particularly under the circumstances in which the scene is at a temperature substantially different from those parts of the apparatus from which the detectors receive radiation at times other than the picture active period.

Although, as shown in the drawings, the preferred embodiment involves analog compensating circuitry, it would also be possible, although it is not preferred, to implement the invention digitally. In this case, references in the claims to "first" and "second" storage means should be taken as including different locations in the same memory.

Although in the preferred embodiment transfer of signals from the first storage means (capacitor 32) to the second storage means (capacitor 38) takes place once every field or frame (i.e. once every two fields) it is possible for the transfer to take place less frequently. For example the transfer may take place at a frequency within the range of once every field to once every ten fields (i.e. once every five frames in an interlaced system). However, as the frequency of transfer decreases, flicker noise increases and would become unacceptable if transfer from the first storage means to the second storage means were to take place less frequently than once every ten fields. The optimum is to transfer once every field or once every frame.

The reference to "frames" is a reference to a pair of interlaced fields where an interlacing system is utilized. In non-interlaced systems, a field is the same as a frame.

I claim:

1. A thermal imager comprising:
   an array of thermal detectors;
   optical means for producing a thermal image and for scanning said thermal image across said array of detectors so that each detector produces an output representing a succession of pixels in said image; and
   compensating means connected to said detectors for compensating for differences in the sensitivities of said detectors, said compensating means comprising a plurality of first storage means each associated with a respective different one of said detectors, means for forming in each said first storage means a first signal dependent upon the mean output of the respective detector over a predetermined period which is such that said mean output is derived from a plurality of pixels in each of a plurality of lines in said image, a plurality of second storage means each associated with a respective different one of said detectors, means for transferring said first signals from each said first storage means to said respective second storage means not more than once each field, and means for applying to the signal from each detector a correction signal derived from said respective second storage means.

2. A thermal imager according to claim 1, wherein said compensating means comprises a plurality of individual analog compensating circuits each connected to a respective different one of said detectors.

3. An imager according to claim 2, in which each said first storage means comprises an integrator.

4. An imager according to claim 3, wherein said integrator is a Miller integrator.

5. An imager according to claim 3, in which compensating circuit includes a switch for supplying a signal to said integrator during picture active periods.

6. An imager according to claim 2, wherein said transferring means comprises switch means operated at frame frequency.

7. An imager according to claim 2, wherein said transferring means comprises switch means operated at field frequency.

8. An imager according to claim 2, wherein said second storage means comprises a capacitor.

9. An imager according to claim 2, wherein said applying means comprises a differencing amplifier.

10. An imager according to claim 2, wherein said first storage means comprises a Miller integrator arranged for receiving signals from said detector during picture active periods, said second storage means comprises a capacitor, and said applying means comprises an inverting amplifier arranged to receive signals from said capacitor and a differencing amplifier, the differencing amplifier having a first input for receiving signals from the detector, a second input for receiving signals from the inverting amplifier and an output from which signals are supplied to the Miller integrator.

11. An imager according to claim 1, wherein said predetermined period is a whole field.

12. An imager according to claim 1, wherein said predetermined period is two fields.

13. An imager according to claim 1, wherein each said first signal is transferred to said storage means at least once every ten fields.

14. An imager according to claim 13, wherein said fields are in interlaced pairs to form frames.

15. An imager according to claim 1, wherein each said first signal is transferred to said storage means once every two fields.

* * * * *